April 27, 1965  R. C. RINGHOLZ  3,180,258
VALIDATING METER APPARATUS
Filed July 25, 1963  3 Sheets-Sheet 1
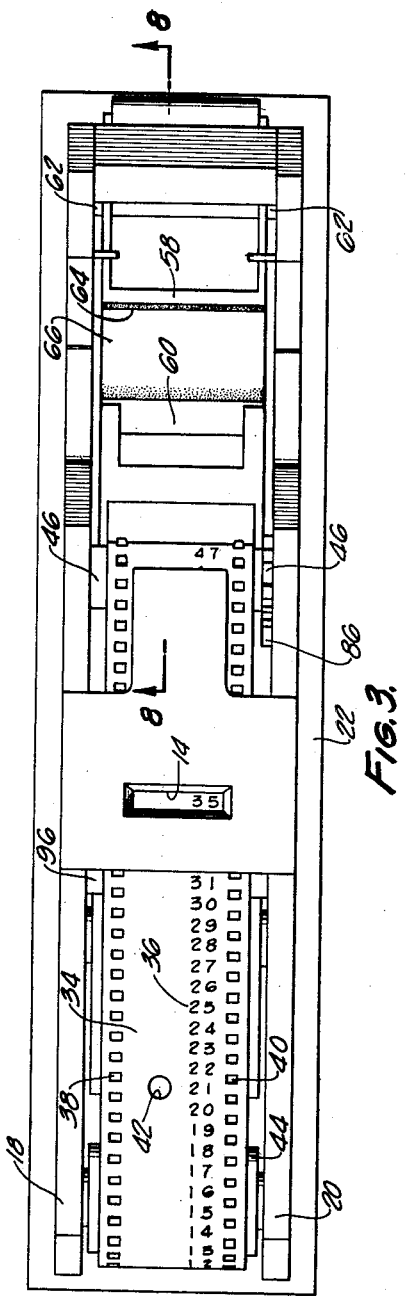
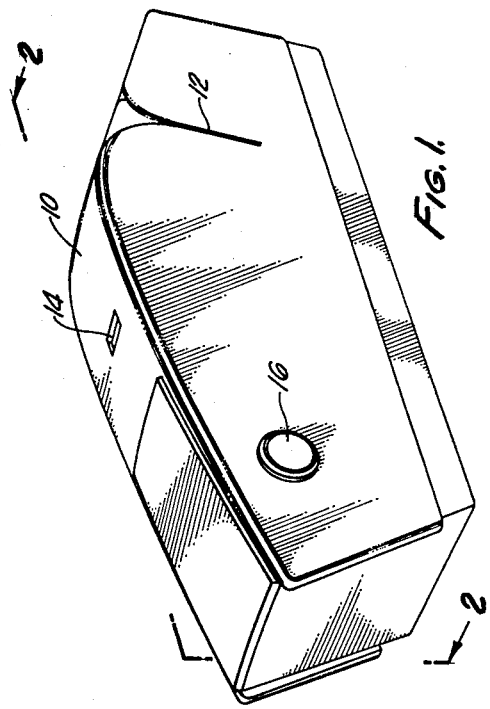
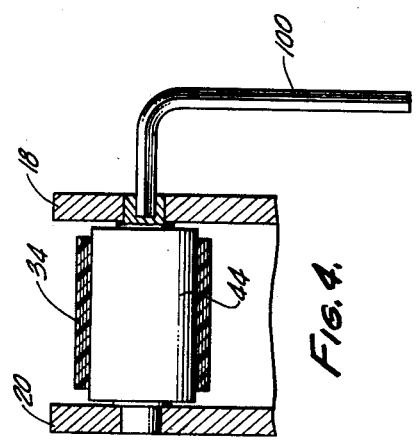
INVENTOR.
ROBERT C. RINGHOLZ
BY Samuel Lindenberg
ATTORNEY

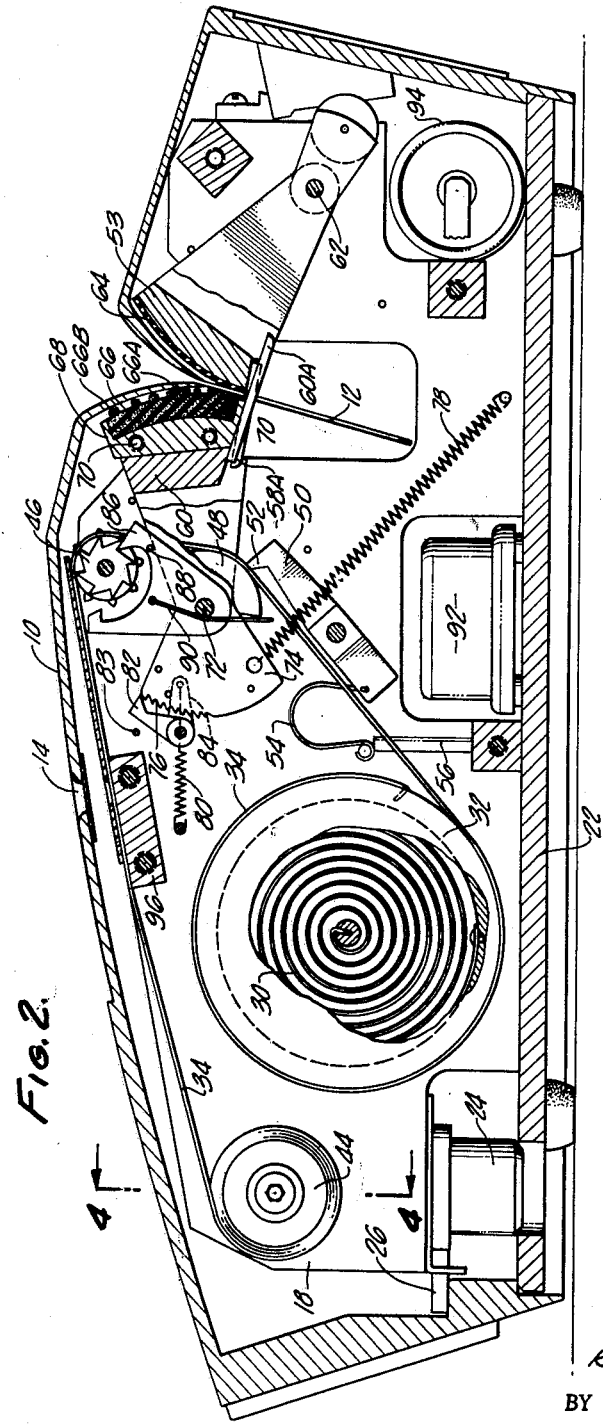

United States Patent Office 3,180,258
Patented Apr. 27, 1965

3,180,258
VALIDATING METER APPARATUS
Robert C. Ringholz, 436 Court St., San Bernardino, Calif.
Filed July 25, 1963, Ser. No. 297,628
6 Claims. (Cl. 101—235)

This invention relates to apparatus for printing on a predetermined number of tickets or cards to effect validation thereof, and more particularly to improvements in validating meter apparatus.

With the advent of "Shopping Centers" in the suburbs surrounding cities during the last several years, the downtown or central core business districts have been faced with a serious problem of meeting the so-called "free-parking" competition offered by the said shopping centers.

Hundreds of cities throughout the United States, or world, have solved this problem through either the Chamber of Commerce, or a downtown Merchants Association, or variations thereof, establishing what is commonly called a "Validating Organization," which in effect permits all Business, Professional and Institutional entities located downtown to say to the public—"If you will come downtown, we will pay for your parking charges, or if you ride the bus or take a taxi downtown, we will pay for your ride home."

This is accomplished in the following manner:

The Validating Organization has printed up gummed stamps with suitable indicia thereon; these stamps are then sold to the various businesses, etc., who wish to participate in the validating plan; then when a customer patronizes that "Validator," one or more of these gummed stamps are stuck on his parking lot ticket or bus or taxi ticket, and these stamps are good for either time credit or money credit toward his parking lot charges or bus or taxi fare home.

These "stamped" tickets are saved by the Transit Company, Taxi Company and the parking lots participating in the plan, and are later redeemed by the Validating Organization at a slightly lower figure than they originally sold the stamps for to the "Validators."

While this plan is universally used, for want of something better, it is nevertheless rather messy and cumbersome, presents difficult auditing problems, and it appears that the virtue of honesty in the foregoing arrangement is not present to the extent that it should be.

These gummed stamps frequently fall off the tickets, or are detached and used in an unauthorized manner, they are also stolen by customers, and pilfered by Validator's employees, and detached from tickets and sold or used unauthorizedly by parking lot employees and bus or taxi drivers.

In another arrangement used in some few places, a printed (rubber) stamp is applied to the tickets by the Validator, and the parking lot owner and the Transit Company and Taxi Company saves these and submits them later to the Validator who pays for them. Obviously this plan also is subject to all of the dishonesty and difficulties and abuses enumerated in the foregoing mentioned gummed stick-on stamp plan.

An object of this invention is to provide a device for validating parking lot tickets and Transit Company or Taxicab Company tickets which minimizes the chances of dishonesty occurring on the part of either parking lot employees or merchants employees, Taxi Company employees and the Validator's customers.

Another object of the present invention is the provision of a parking lot ticket validating apparatus which is simple to use.

Yet another object of the present invention is the provision of a parking lot ticket validating apparatus which eliminates the bother of applying gummed stamps to the tickets for the validation thereof.

Still another object of the present invention is the provision of a parking lot ticket validating apparatus which can only validate a predetermined number of such tickets and advises the merchant each time a ticket is validated.

Another object of the present invention is the provision of a novel, unique, useful and efficient validating apparatus.

These and other objects of the present invention may be achieved in an arrangement whereby a validating apparatus has a counting arrangement which is preset by the Validating Organization in accordance with a payment made to them by the merchant, to count a predetermined number of validations. The validations are achieved by inserting the parking lot ticket into a slot provided in the apparatus. The ticket must be completely inserted into the slot in the apparatus before a validating imprint is placed thereon. The ticket cannot be withdrawn from the slot if it is only partially inserted thereinto. Each time a print is made on the ticket a buzzer or other signal is energized to let the merchant know that his validating apparatus is being used. The counter lets the merchant know how many validations are left in the apparatus, so that he has ample time to call the Validating Organization to raise the number of pre-paid validations. Only the Validating Organization has access to the inside of the apparatus for setting the number of pre-paid validations. When the last validation has been used, the apparatus is blocked to prevent the insertion of any additional tickets. The printer in the apparatus may contain an unusual insignia and combination of colors. It is changeable as desired.

The novel features that are considered characteristic of this invention are set forth with particularity in the appended claims. The invention itself both as to its organization and method of operation as well as additional objects and advantages thereof, will best be understood from the following description when read in connection with the accompanying drawings, in which:

FIGURE 1 is an isometric view of the external appearance of an embodiment of this invention.

FIGURE 2 illustrates the appearance of the invention with one side of the cover thereof removed along the lines 2—2 of FIGURE 1.

FIGURE 3 shows the appearance of the embodiment of the invention as seen from above with a portion of the top cover removed.

FIGURE 4 is a detail along lines 4—4 in FIGURE 2 showing how the counting mechanism can be set to provide a predetermined number of validations.

FIGURE 9 is a circuit diagram showing how the electrical indicator which informs a merchant that the validating apparatus is being used, is energized.

Figure 5:
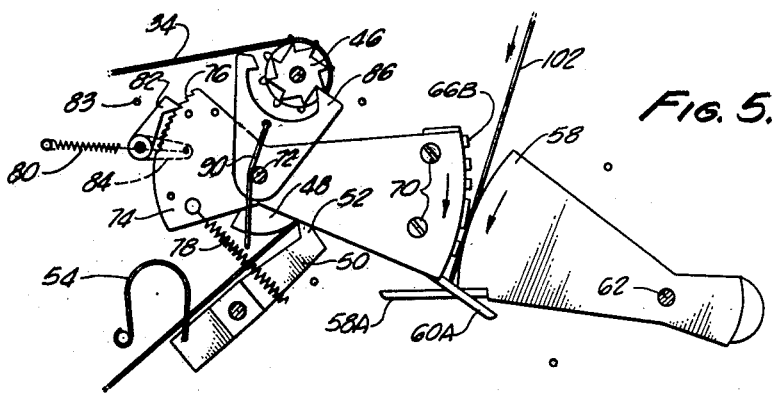
FIGURES 5 through 7 show various positions through which the printing portion of the validating apparatus assume in response to the insertion therein of a card.

FIGURE 1 illustrates the external appearance of an embodiment of the invention. This comprises a decorative housing 10, which fits over all the mechanical apparatus of the embodiment of the invention. This housing contains a slot 12, into which the parking ticket to be validated is inserted. A counter opening 14, in the top of the housing, enables the merchant to see how many validations he has left. On either side of the housing are decorative jewels, 16.

FIGURE 2 is a side view of the appearance of the invention along the lines 2—2 of FIGURE 1, illustrating its appearance with one side of the housing 10 removed. The mechanism is supported between two side walls 18, 20 (which are shown in FIGURE 3). These two side walls are rigidly supported from a base 22. A locking mechanism 24 has a rotating member 26, which is key actuated to engage and hold closed the housing 10, when it is superimposed over the base 22. Thus access to the interior of the mechanism is obtainable only by a person who has a key to the locking mechanism 24.

The counting mechanism for the validating apparatus comprises a motor 30, here exemplified by a spring operated mechanism, which rotates a drum 32. The drum, as it is permitted to rotate, winds on itself a tape 34. This tape, as may be better seen in the top view in FIGURE 3, has a sequence of numbers 36, printed thereon. These numbers are the ones which appear in the housing opening 14, to advise the merchant of the number of remaining validations. The tape has a plurality of sprocket holes 38, 40, on both sides thereof. The tape also has a stop opening 42, positioned thereon, whose function will become more clear as this explanation progresses.

An idler drum 44, serves to define the other end of the path of the tape. Thus the tape in response to permissive actuation by an escapement mechanism to be described, is paid off of the drum 44, extends under the opening 14, passes over a sprocket wheel 46, which engages the sprocket holes thereof, and then passes over the surface of a guide cam 48 around the drum surface 32. A stop member 50, has its operating end 52 biased against the tape by a spring 54. The spring 54 is supported from the sidewall 18. It holds the stop member 50 in position. The member 56 is part of a guide for the tape. The operating end 52 of the stop member where is urged against the tape 34, when the last validation has been printed out, passes through the stop opening 42 in the tape, into a suitably positioned opening (shown in FIGURE 8), in the guide cam 48. In this manner, as will become more apparent from the following description, no further validations can be printed and the mechanism is locked against further insertion of tickets into the opening 12. The stop member 50 is retracted from the engagement with the opening in the guide cam 48 only when the tape 34 is rewound on the take-up drum 44.

When a ticket is inserted into the slot 12, printing does not occur thereon until the ticket has been pushed to the bottom of the slot. This is insured by the size and shapes selected for the printing back-up member 58, the printer carrying member 60. These are selected so that the opposing operating face portions of these members are shaped as circular arcs which are tangent to one another when the members are moved to the printing position (see FIGURE 6). The printing back-up member 58, is pivotably supported by a pivot 62. It has a curved backing face 64, which opposes the curved type face 66, carried by the printer carrying members 60. It extends beyond the pivot 62 and carries a weight 63, to return it to its starting position. The type face is held in a holder 68 which is attached to the print carrying member 60 as by screws 70. The type face member 66 may be made of material, such as "Porelon," made by the Johnson Wax Company, which is impregnated with ink so that it does not have to be reinked after each printing or each number of printings.

The printer carrying member 60 is pivotably supported on a shaft 72. It flares out on the other side of the shaft to a ratchet portion 74, having ratchet teeth 76 on the external edge thereof. A spring 78 has one end attached to the side wall 18, and the other end is attached to the ratchet portion 74 to bias the printer carrying member to an inoperative or starting position. Another spring 80, has one end attached to the side wall 18, and the other end attached to a double pawl member 82, 84. The double pawl member is pivotably supported in the side wall. The spring 80, together with the portion 84, of the double ratchet member operate to maintain the pawl portion 82 in engagement with the ratchet teeth 76, whereby when the printer carrying member 60 is moved toward the printing position, it cannot be returned unless it is completely moved into the printing position. At this time the spring pulls on the member 84 causing it to pivot and to lift the pawl 82 out of engagement with the ratchet teeth whereby the printer carrying member can be returned by the spring 78 to its starting position. This is more clearly illustrated in FIGURES 5, 6 and 7.

The shaft 72 also carries an escapement pawl 86. This escapement pawl has a protrusion 88 thereon, which engages the top edge of the printer carrying member 60. A spring 90, also having one end anchored in the sidewall 18, operates to bias the escapement pawl 86 against the printer carrying member top surface.

By way of illustration of a device for indicating that the apparatus is being used, there is shown a buzzer 92 fastened to the base 22, of the validating apparatus. A battery 94 may be positioned or carried within the apparatus for energizing the buzzer whenever a ticket is inserted into the slot 12. As shown in FIGURE 9, the buzzer 92 is energized by the battery 94, when a pawl member 82 is moved to touch a contact 83 whereby the circuit to the buzzer is closed. The buzzer may be replaced by a light which is remotely located and to which connection may be made from the apparatus in a manner well known in the art.

Initially, in order to establish the apparatus in operating position, it is necessary to wind up some of the tape 34 on the drum 44. This may be done in a number of ways including requiring that the Validating Organization who alone controls the validating meter, opens the lock 24, with a key, removes the housing or cover 10 from the base 22, and then by using a suitable tool, such as an Allen wrench winds back on the drum 44 until the number of validations for which payment has been made shows in the window opening. At this point is should be noted that a back stop 96, which is attached to the side walls presses the tape 34 up against a plate 98, which is supported within the housing on the side wall, which has an opening which is aligned with the opening 14. The purpose of this is to enable the proper setting of the number on the tape corresponding to the number of validations for which prepayment has been made. As shown in FIGURE 4, after the housing is removed, an Allen wrench 100 is inserted into a suitably shaped receptacle attached to the axle of the drum 44. The Allen wrench may then be rotated until a number corresponding to the desired number of validations appears in the slot in the plate 98. The housing is then replaced over the mechanism and locked.

Figure 6:
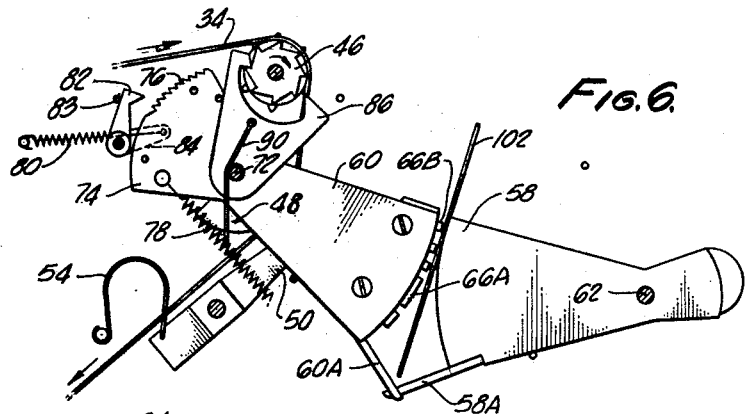
Figure 7:
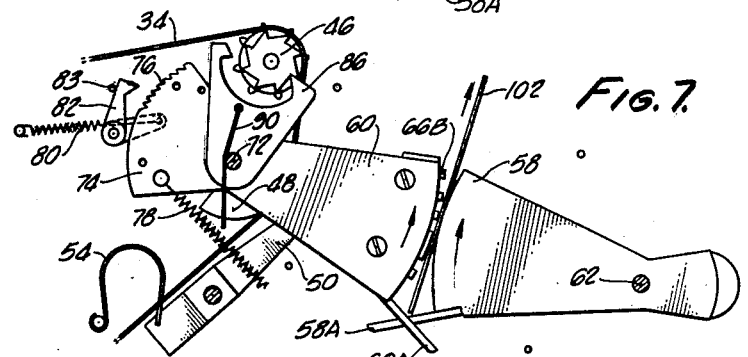

The operation of the mechanism in response to an insertion of a parking ticket to be validated is shown in FIGURES 5, 6 and 7. The ticket 102 is inserted in the slot 12. It is pushed downward until it engages the fingers 58A, 60A, which respectively extend from the bottoms of the print back-up member 58 and the printer carrying member 60. As the ticket continues to be pushed down the respective print back-up member 58 and the printer carrying member 60 are pivoted downward. Because of the biasing action of the spring 90 the escapement pawl 86 follows the motion of the printer carrying member 60 enabling the ratchet wheel 46 to rotate the distance provided between two teeth. When the printer carrying member returns to its initial position the ratchet wheel 46 rotates another tooth increment. This advances the tape 34 so that the next lowest number appears in the window 14. The tape 34 is wound up around the drum 32 under the rotational force actuated by the motor 30. At this time it should be noted that the operation of winding up tape on the take-up drum 44 serves to tighten the spring of the spring motor 30 thereby storing up energy for this motor to advance the tape. As the tape advances it decreases the number shown in the opening 14.

The pawl 82 stays in engagement with the ratchet teeth 76 all during the time that the print carrying member is moved downward. Thereby any attempt to withdraw the ticket is blocked because the ticket is held between a non-printing portion 66A of the type face, which is specifically provided therefor, and the print backing member 58. This prevents a ticket insertion for the purpose of printing without tripping the counting mechanism to decrease the number of allowed validations. Furthermore, as soon as the members 58 and 60 are moved to the printing position the buzzer circuit or other warning device is operated and remains operated until the members 58 and 60 have been returned to their initial positions. When the ticket is fully inserted, as shown in FIGURE 6, then the print portions 66B of the type face 66 engage the ticket and print thereon. At this time the pawl 82 is pivoted out of engagement with the ratchet teeth 76. At this time also, the escapement 86 has moved sufficiently to allow the spring motor to rotate and thereby pull the tape the increment permitted by the escapement pawl and ratchet wheel mechanism.

FIGURE 7 shows the appearance of the apparatus as the ticket 102 is being withdrawn. Under the influence of the biasing spring 78, and under the influence of gravity respectively as well as by the pull exerted by the card being withdrawn, the printer carrying member and the print back-up member follow the card back to their initial positions thus enabling the card to be completely withdrawn. The buzzer sounds until the apparatus is restored to its initial inactive position. The escapement 86 returns to its initial position thereby enabling a completion of the advance of the tape the amount requisite to transfer the tape the distance between numbers under the opening 14.

Figure 8:
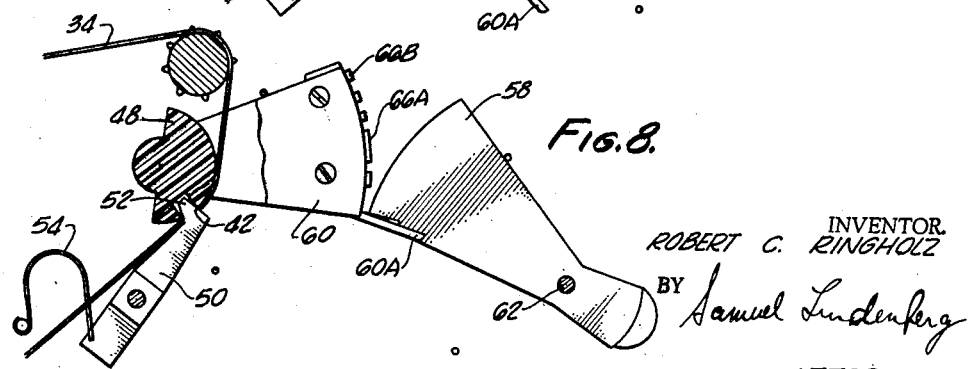
FIGURE 8 is a section along lines 8—8 in FIGURE 3 showing how the validating apparatus locks up after the last validation has been used.

FIGURE 8 shows the appearance of the apparatus when all the validations which have been prepaid are used up. When this occurs, the stop member 50 extends through the opening 42 in the tape 32. It extends into a suitably provided opening in the cam member 48. Since the cam member 48 is a part of the printer carrying member 60 the printer carrying member will not move when a card is inserted into the slot 12. As a result, the apparatus cannot be used for any further validations until such time as the tape 34 is rewound on the drum 44. At this time the stop member 50 is moved out of the hole by the force of the tape moving back over the drum 44. The apparatus can then be used for validating operations again.

From the foregoing it will be seen that a simple apparatus for validating tickets has been provided which prevents theft on either the part of the parking lot employees or the merchants employees. The apparatus shown is illustrative and should not be construed as a limitation upon the spirit and scope of this invention. For example, if desired, an electrically operated motor may be employed in place of the spring wound motor. Also the battery and buzzer may be replaced by a remotely located indicating device actuated by the operation of the validating apparatus. Further, electrical actuating means may be employed for moving the print back-up member and printer carrying member through their respective paths, which apparatus is triggered by the insertion of a card in the slot 12. The type face member 66 may bear an indicia which identifies the merchant who uses the validating apparatus. The Validating Organization by keeping a record of the number of validations sold and by counting the uniquely stamped identifiable tickets from each merchant can readily determine whether a forgery has been attempted of the stamp and which merchant has been guilty of this. The merchant knows each time his validation meter is used and thus keeps a check on its use.

There has accordingly been described and shown herein a novel, useful, efficient, and unique apparatus for validating a ticket of a parking lot; also a Transit Company's customers bus ticket; or a Taxi Company customer's ticket.

I claim:

1. Apparatus for providing a validating mark on a predetermined number of tickets comprising counting means settable to a count indicative of said predetermined number of tickets, printing means including a type backing member and a printer carrying member, means pivotably supporting said backing member, means pivotably supporting said type carrying member in opposite cooperative relation with said backing member to permit the insertion of a ticket to be printed on therebetween, ticket engaging fingers extending from one end of said print backing member towards said printer carrying member, ticket engaging fingers extending from one end of said printer carrying member toward said print backing member, whereby a ticket inserted between said print backing member and said printer carrying member engages said fingers and pivotably moves said printer carrying member and print backing member to bring them in printing engagement therewith, counter means, means responsive to a ticket actuating said print back-up member and printer carrying member until a print is made on said ticket for altering the count of said counter, means responsive to said counter indicating a predetermined number of tickets having been printed for preventing motion of said printer carrying member, and means for providing an indication when a ticket actuates said printer carrying member and said print backing member.

2. Apparatus for printing validation indicia on a predetermined number of tickets as recited in claim 1 wherein said counter means comprises a first and second rotatably supported reel, a tape extending from one reel to a second reel, motor means for rotating said second reel for pulling said tape from said first reel onto said second reel, and an escapement means actuated responsive to operation of said printer carrying member by a ticket for enabling said tape to be moved a predetermined unit length by said motor driven second reel.

3. Apparatus for printing validating indicia on a ticket comprising means defining a slot to which a ticket to be printed is inserted including a print back-up member and spaced therefrom and opposed thereto a printer carrying member, means pivotably supporting said print back-up member, means pivotably supporting said printed carrying member, said print back-up member and printer carrying member having opposed faces which are curved along arcs which are tangent to one another when said members are pivotably moved from an inactive position to a printing position by a ticket inserted therebetween, counter means actuated to alter its count each time said printer carrying member is moved to said printing position, said counter means including first and second rotatably mounted drums, a tape having number indicia printed thereon, said tape being wound on the periphery of said first drum, extending therefrom past a viewing window over the periphery of said second drum, means for rotatably driving said second drum, and an escapment means actuatably responsive to motion of said printer carrying member from an inoperative to a printing position and back to an inoperative position for enabling said escapement means to permit said tape to advance in response to the motor drive of said second drum a distance equal to the distance the two indicia on said tape, and means responsive to the counter means attaining a predetermined count to prevent motion of said printer carrying member.

4. Apparatus as recited in claim 3 wherein said means responsive to the counter means attaining a predetermined count to prevent motion of said printer carrying member comprises a cam surface attached to said printer carrying member and moveable therewith, said tape passing over said cam surface, an aperture in said tape placed to be aligned with said aperture in said cam when said counter means has attained said predetermined count, a stop member positioned over said tape at the location of the aperture in said cam surface, and spring means for yieldably pressing said stop member against said tape to pass through said opening in said tape into the aperture in said cam surface when said tape opening is aligned therewith.

5. Apparatus for providing a validating mark on a ticket comprising means including a type backing member and a printer carrying member, means pivotably supporting said type backing member, means pivotably supporting said type carrying member in opposite cooperative pressure relationship with said backing member to permit the insertion of a ticket to be printed on therebetween, said pressure being sufficient to prevent withdrawal of a ticket after said members have been pivoted by said ticket toward a printing position, means coacting with said members to prevent retrograde pivoting until a printing operation has been effectuated, means actuated in response to said members being pivoted a predetermined distance for disabling said means to prevent retrograde pivoting to enable retrograde pivoting of said members for withdrawing said ticket.

6. Apparatus as recited in claim 5 wherein there is included counter means actuated to alter its count each time said printer carrying member is moved to said printing position, and means responsive to said counter means attaining a predetermined count to prevent pivoting motion of said printer carrying member toward said printing position.

References Cited by the Examiner
UNITED STATES PATENTS

| | | | |
|---|---|---|---|
| 2,104,624 | 1/38 | Royce et al. | 101—91 |
| 2,338,590 | 1/44 | Komusin | 101—100 |
| 2,868,456 | 1/59 | King | 235—132 |

EUGENE R. CAPOZIO, *Primary Examiner.*